US012494333B2

(12) United States Patent
Song et al.

(10) Patent No.: US 12,494,333 B2
(45) Date of Patent: Dec. 9, 2025

(54) FAULT BREAKING CONTACTOR WITH DYNAMIC AIR GAP MECHANISM

(71) Applicant: SENSATA TECHNOLOGIES, INC., Attleboro, MA (US)

(72) Inventors: Peter Donghae Song, Santa Barbara, CA (US); Matthew Jackvony, Shrewsbury, MA (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 0 days.

(21) Appl. No.: 18/592,506

(22) Filed: Feb. 29, 2024

(65) Prior Publication Data

US 2025/0054716 A1 Feb. 13, 2025

Related U.S. Application Data

(60) Provisional application No. 63/518,402, filed on Aug. 9, 2023.

(51) Int. Cl.

*H01H 50/14* (2006.01)
*H01H 50/16* (2006.01)
*H01H 50/56* (2006.01)

(52) U.S. Cl.

CPC .......... *H01H 50/163* (2013.01); *H01H 50/14* (2013.01); *H01H 50/56* (2013.01)

(58) Field of Classification Search

CPC ....... H01H 50/163; H01H 50/14; H01H 50/56
USPC .......................................................... 335/220
See application file for complete search history.

(56) References Cited

U.S. PATENT DOCUMENTS

| | | | | |
|---|---|---|---|---|
| 4,712,079 A * | 12/1987 | Marquardt | H01H 50/545 | 335/198 |
| 7,935,905 B2 * | 5/2011 | Puri | H01H 13/365 | 200/447 |
| 8,816,803 B2 * | 8/2014 | Naka | H01H 1/54 | 335/133 |
| 8,836,456 B2 * | 9/2014 | Tachikawa | H01H 1/06 | 335/196 |
| 8,853,585 B2 * | 10/2014 | Tachikawa | H01H 9/443 | 335/201 |

(Continued)

FOREIGN PATENT DOCUMENTS

| | | |
|---|---|---|
| DE | 2261288 A1 | 6/1974 |
| DE | 19540972 A1 | 5/1997 |

(Continued)

OTHER PUBLICATIONS

International Search Report and Written Opinion, PCT/US2024/034274, Oct. 16, 2024, 11 pages.

*Primary Examiner* — Shawki S Ismail
*Assistant Examiner* — Lisa N Homza
(74) *Attorney, Agent, or Firm* — Mark H. Williams

(57) ABSTRACT

Fault breaking contactors are disclosed. In an embodiment, an electromechanical switching device includes one or more terminals; a moveable contact; and an actuator assembly for moving the moveable contact between a closed position in which the moveable contact contacts the one or more terminals and an open position in which an air gap is maintained between the moveable contact and the one or more terminals; and a dynamic air gap mechanism configured to increase the air gap beyond that of the closed position in response to a fault current.

6 Claims, 9 Drawing Sheets

(56) References Cited

U.S. PATENT DOCUMENTS

| | | | | |
|---|---|---|---|---|
| 8,994,482 | B2 * | 3/2015 | Yokoyama | H01H 9/362 335/131 |
| 2005/0072591 | A1 * | 4/2005 | Hayase | H01H 50/14 174/667 |
| 2009/0322453 | A1 * | 12/2009 | Kawaguchi | H01F 7/1615 335/81 |
| 2009/0322455 | A1 * | 12/2009 | Yoshihara | H01H 51/2209 335/189 |
| 2013/0021122 | A1 * | 1/2013 | Uchida | H01H 1/54 335/131 |
| 2013/0257567 | A1 * | 10/2013 | Takaya | H01H 50/38 335/133 |
| 2014/0014622 | A1 * | 1/2014 | Naka | H01H 50/163 218/4 |
| 2015/0015350 | A1 * | 1/2015 | Tachikawa | H01H 50/18 335/131 |
| 2015/0022291 | A1 * | 1/2015 | Kashimura | H01H 9/46 218/148 |
| 2015/0380145 | A1 * | 12/2015 | Koch | H01H 1/20 335/282 |
| 2017/0365431 | A1 * | 12/2017 | Sakai | H01H 50/42 |
| 2019/0013171 | A1 * | 1/2019 | Minowa | H01H 50/44 |
| 2019/0122844 | A1 * | 4/2019 | Minowa | H01H 50/36 |
| 2019/0311871 | A1 * | 10/2019 | Minowa | H01H 1/64 |
| 2020/0176208 | A1 * | 6/2020 | Mori | H01H 50/04 |
| 2020/0234899 | A1 * | 7/2020 | Shimizu | H01H 50/14 |
| 2020/0286702 | A1 * | 9/2020 | Kodama | H01H 50/60 |
| 2021/0082647 | A1 * | 3/2021 | Harimochi | H01H 50/02 |
| 2021/0151271 | A1 * | 5/2021 | Kodama | H01H 50/54 |
| 2021/0193421 | A1 * | 6/2021 | Yoo | H01H 50/546 |
| 2021/0313133 | A1 * | 10/2021 | Yoo | H01H 50/44 |
| 2021/0335565 | A1 * | 10/2021 | Kawaguchi | H01H 50/38 |
| 2023/0154710 | A1 * | 5/2023 | Tsutsumi | H01H 50/023 335/132 |

FOREIGN PATENT DOCUMENTS

| | | | |
|---|---|---|---|
| EP | 2800116 | B1 | 11/2014 |
| WO | 2017157342 | A1 | 9/2017 |

* cited by examiner

FAULT BREAKING CONTACTOR WITH DYNAMIC AIR GAP MECHANISM

BACKGROUND

Electromechanical switching devices, such as contactors and relays, are designed to carry a certain amount of electrical current for certain periods of time. Existing designs struggle to perform during the very high current, short duration events commonly called short-circuits, which can cause the internal electrical contacts to separate destructively (commonly called contact levitation).

Typically, high voltage contactors cannot be used to break electric vehicle battery short circuits as the electromechanical switching device air gap between the contactors is too small to interrupt the load. Instead, existing systems often use melting fuses or pyro-switches to clear battery short circuits. However, melting fuses or pyro-switches are one more component that increases the cost and complexity of the electromechanical switching device. An electromechanical device that provides a short circuit interrupt function without melting fuses or pyro-switches could reduce cost and complexity of the design and therefore be advantageous over existing systems.

In prior implementations, electromechanical switching devices use large surface area terminals for the most optimal current-carry performance. In these prior designs, the terminal geometry may be robust enough to withstand an arcing event with minimal material transfer, providing consistent electrode gap over life. In these designs, the initially determined gap will not change throughout its lifecycle. However, if the fixed gap is not sufficient for the short circuit requirement, then the switching device will not be able to suppress an electrical arc and rupture when internal pressure reaches the switching device's hermetic enclosure's structural limit. The prior switching device design may also have restrike concerns due to excessive impact energy while the switching device is opening. A solution in electromechanical switching devices to high-power electrical load switching without contact restrike or rupturing would therefore be advantageous.

SUMMARY

Embodiments of the present disclosure are directed to fault breaking contactors including electromechanical switching devices that can dynamically increase the air gap between contacts and terminals in response to short circuit events. In at least one embodiment in accordance with the present disclosure, an electromechanical switching device includes an actuator assembly for moving a moveable contact between a closed position in which the moveable contact contacts the one or more terminals and an open position in which an air gap is maintained between the moveable contact and the one or more terminals. The electromechanical switching device also includes a dynamic air gap mechanism that increases the size of the air gap beyond that of the closed position in response to a fault current. The increased air gap allows the electromechanical switching device to decrease the amount of time taken to stretch an arc and allows the electromechanical switching device to break larger loads. In some examples, an exoskeleton reinforces the arc chamber to prevent rupture.

In a particular embodiment, an electromechanical switching device is disclosed that includes a plurality of terminals with fusing-tips, a moveable contact for connecting with the fusing-tips of the plurality of terminals, and an actuator assembly for moving the moveable contact into contact with the fusing-tips of the plurality of terminals. In this embodiment, the electrode geometry of the fusing-tips increases the effective gap during a high-load arcing event, by intentionally melting the tip of the terminals with the arc energy. That is, the terminal tip acts as a fuse to create additional electrode gap. This self-fusing contactor terminal design provides a novel approach to control the gap between the terminals and the moveable contact during short circuit switching, with minimal changes to the default parameters.

In a particular embodiment, an electromechanical switching device includes one or more terminals, a moveable contact, and an actuator assembly for moving the moveable contact between a closed position in which the moveable contact contacts the one or more terminals and an open position in which an air gap is maintained between the moveable contact and the one or more terminals. The electromechanical switching device also includes an over-travel spring supporting the actuator assembly that acts as a stop on the actuator assembly and positions the actuator assembly relative to a solenoid magnetic circuit. The over-travel spring compresses to provide the increased air gap between the moveable contact and the one or more terminals.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
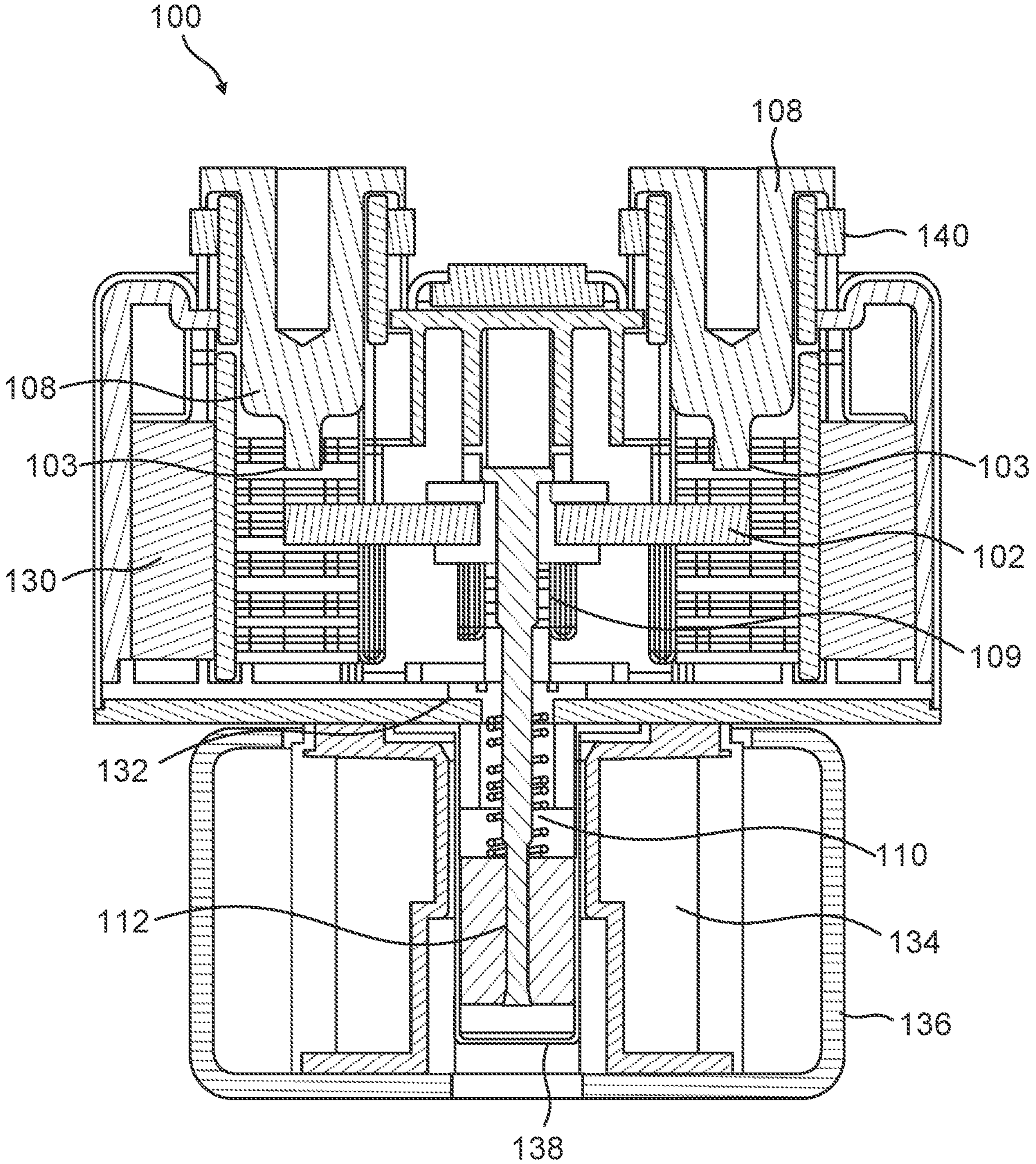
FIG. 1 is a diagram illustrating a cross-sectional view of an example electromechanical switching device with a restrike prevention feature according to at least one embodiment of the present disclosure.

For further explanation, FIG. 1 is a diagram illustrating a cross-sectional view of an example electromechanical switching device 100 with a restrike prevention feature according to at least one embodiment of the present disclosure.

Figure 2A:
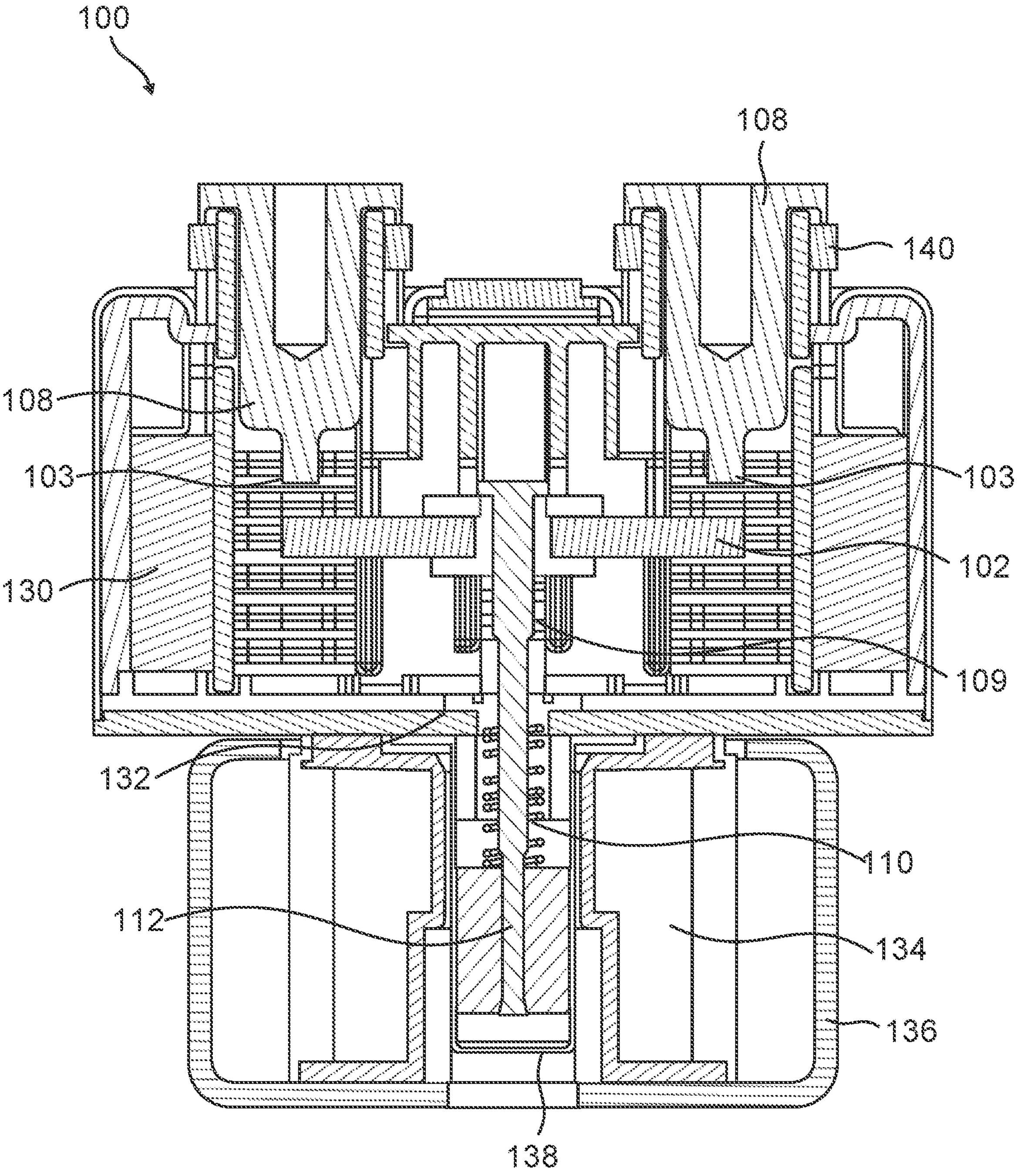
FIG. 2A is a diagram illustrating a side cross-sectional view of the example electromechanical switching device of FIG. 1 with the moveable contact in the OPEN position.
Figure 2B:
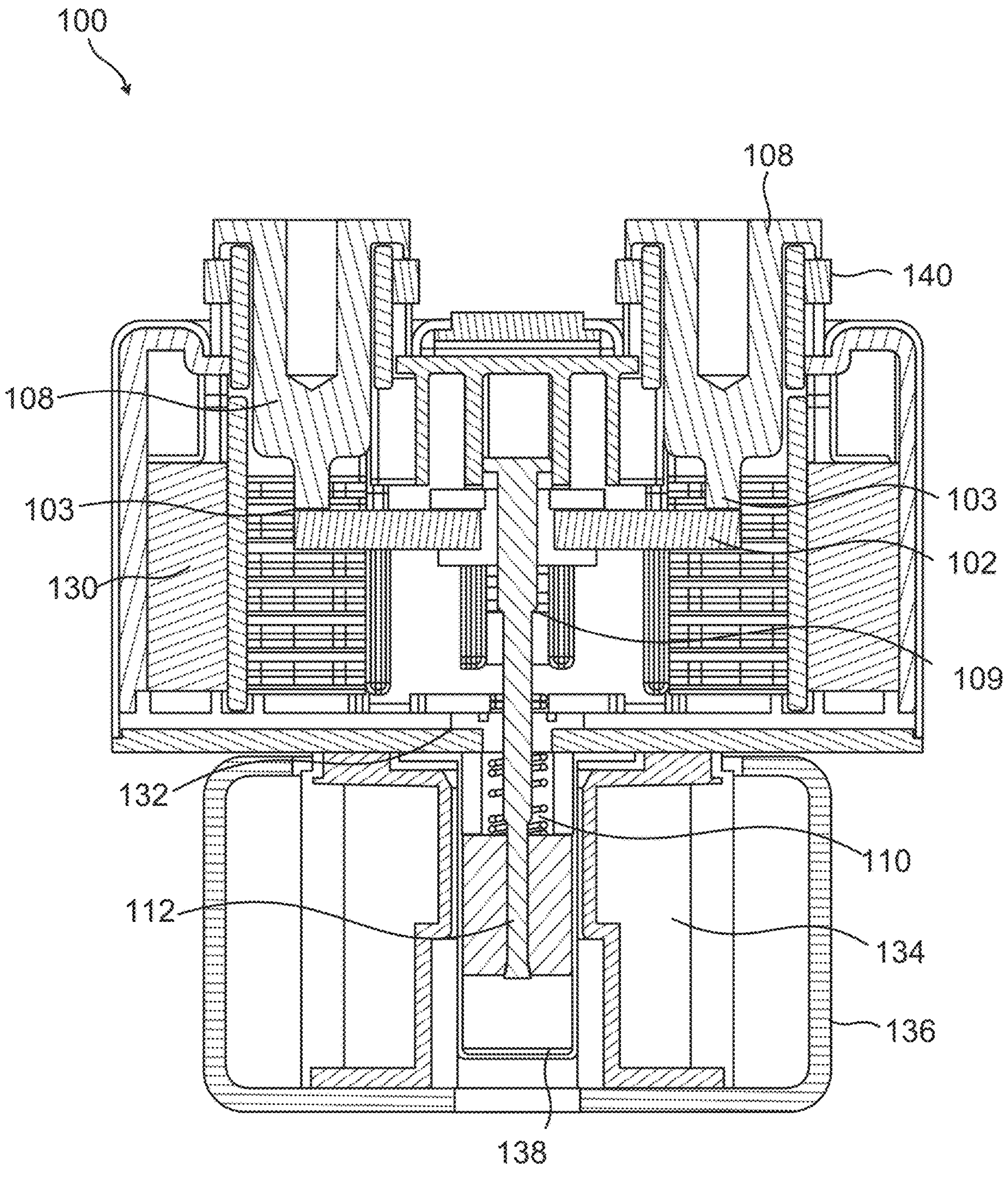
FIG. 2B is a diagram illustrating a side cross-sectional view of the example electromechanical switching device of FIG. 1 with the moveable contact in the CLOSED position.

The switching device 100 of FIG. 1 includes a moveable contact 102, two terminals 108, an upper actuator spring 109, a lower actuator spring 110, an actuator assembly 112, ceramic magnets 130, dampening hard-stop component 132, coil assembly 134, magnetic core 136, hermetic tube 138, and ceramic isolator 140. In the example of FIG. 1 and FIG. 2A, the moveable contact 102 is in the OPEN position and not in contact with the terminals 108. During operation, the actuator assembly 112 may move the moveable contact 102 closer to the terminals 108 such that current flows through the contact 102 and the terminals 108. FIG. 2B shows the electromechanical switching device of FIG. 1 in the CLOSED position where the moveable contact 102 is in contact with the terminals 108.

Figure 2C:
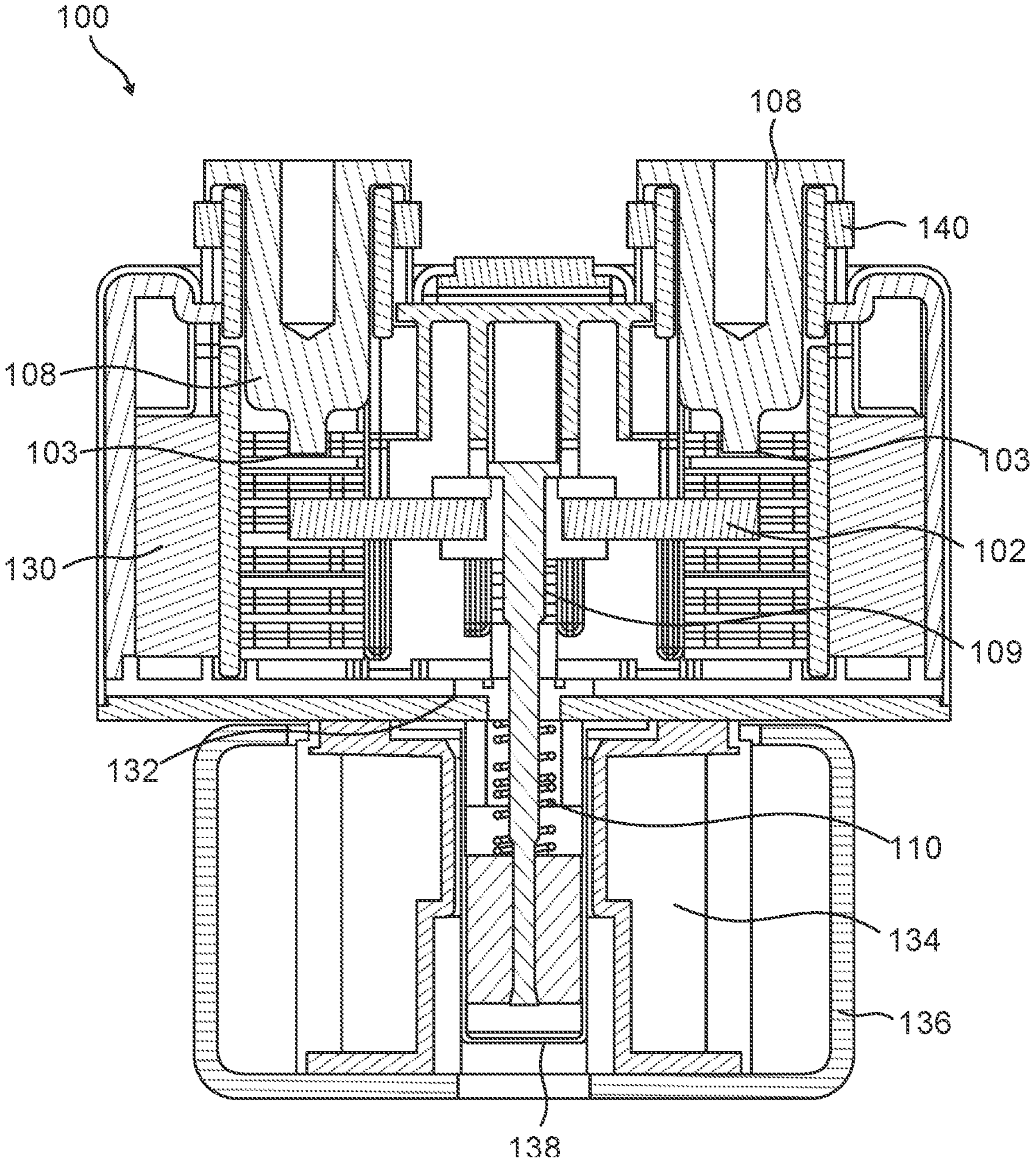
FIG. 2C is a diagram illustrating a side cross-sectional view of the example electromechanical switching device of FIG. 1 with the moveable contact in the POST-INTERRUPT position.

In the example of FIG. 1, the terminals 108 have a fusing-tip 103. In this embodiment, the electrode geometry increases the effective gap during a high-load arcing event, by intentionally melting the fusing-tip 103 of the terminals with the arc energy. FIG. 2C shows the electromechanical switching device of FIG. 1 in the POST-INTERRUPT position where the electrode fusing-tip 103 of the terminals has been melted such that the gap between the terminal and the moveable is increased relative to the OPEN position illustrated in FIG. 2A.

In a particular embodiment, the fusing-tip 103 of the terminals 108 is copper. That is, the terminal 108 acts as a fuse to create additional electrode gap. This self-fusing contractor design provides a novel approach to control electrode gap during short circuit switching, with minimal changes to the default parameters.

In addition, the dampening hard-stop component 132 has a low coefficient of restitution for preventing contact restrike after switch-off. An electromechanical switching device with the restrike prevention feature described above may be an economical and fail-safe solution for many low-power, commuter EV applications, particularly if a one-time-break for short circuit switching is required.

For a conventional electromechanical switching device, if a short circuit is encountered, the device is thrown open by Lorentz force levitation. The inertia of this motion can cause the moveable contact to continue to travel downwards after the actuator plunger hits the hard stop. This effectively compresses the moveable spring and may enable the contactor to break larger loads than it is rated to. The electromechanical device described below seeks to enhance that behavior by replacing the fixed hard stop with an upper actuator spring. This spring enables an even larger dynamic airgap to enhance breaking while maintaining the relationship of the actuator plunger to a solenoid upper and lower static core which is critical to achieve pull-in during normal operation. With this added overtravel, snap catches are introduced to prevent the moveable contact from rebounding, thus preventing an arc from re-forming (restrike).

Figure 3A:
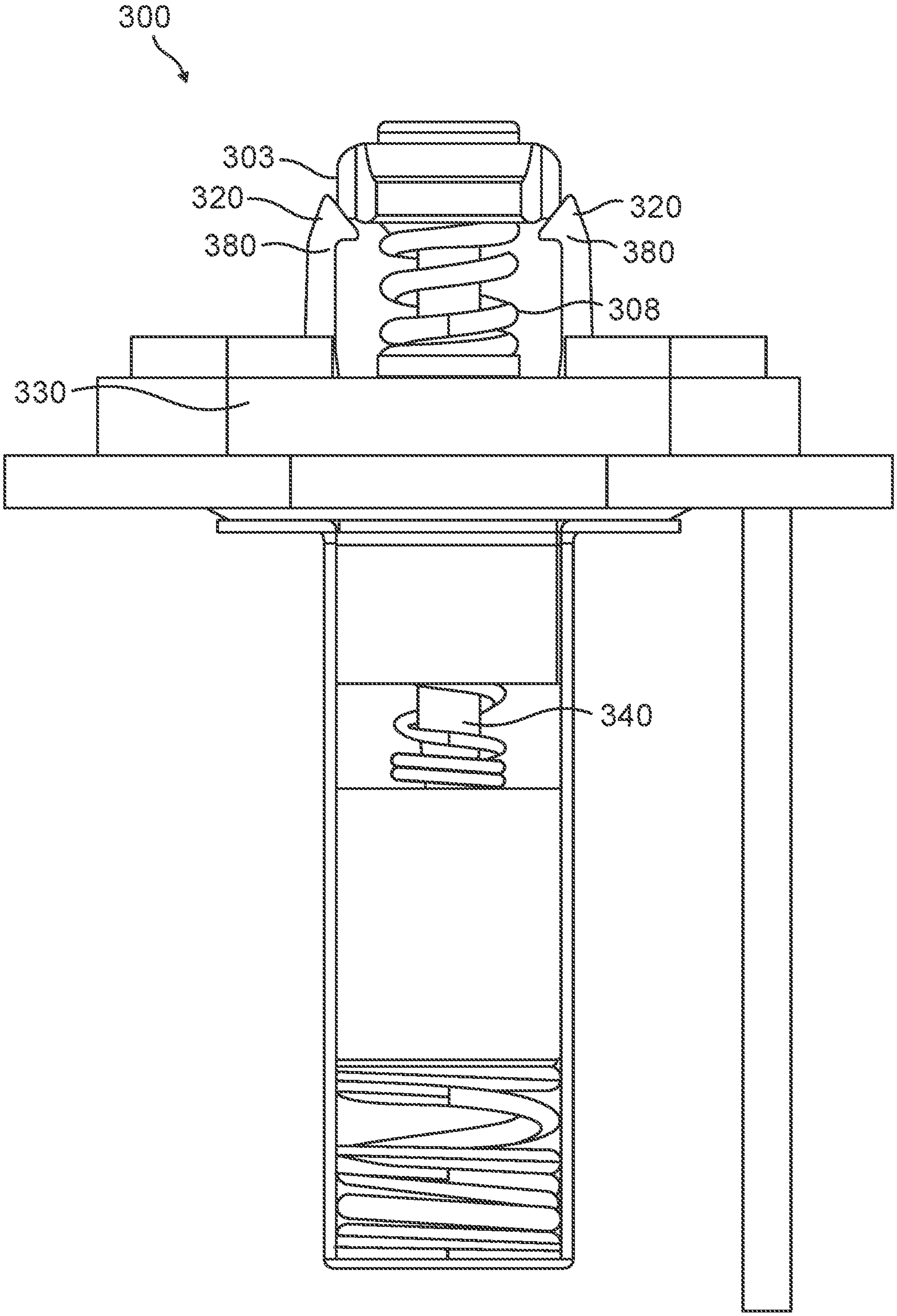
FIG. 3A is a diagram illustrating a cross-sectional view of an example electromechanical switching device with a dynamic over-travel feature according to at least one embodiment of the present disclosure.

For further explanation, FIG. 3A is a diagram illustrating a cross-sectional view of an example electromechanical switching device 300 with an over-travel feature according to at least one embodiment of the present disclosure. The electromechanical switching device 300 includes a plurality of terminals (not pictured) and a moveable contact 303 for opening and closing a connection between the plurality of terminals. The switching device also includes an actuator plunger 340 coupled to the moveable contact 303 and configured to position the moveable contact 303 relative to the plurality of terminals.

In this embodiment, the switching device 300 also includes an upper actuator coil 308 between the moveable contact 303 and a base 330. The upper actuator coil 308 provides a force to move the moveable contact 303 towards the plurality of terminals and provide a hard stop for the moveable contact 303. During max break short circuit events, the force of the fault arcing will throw the contactor (switching device) open and the upper actuator coil 308 may enable an appreciable increase in airgap thus allowing the contactor to break loads that normally require a separate pyro-switch or fuse to interrupt. This will result in a simpler, lower cost, architecture for low cost EVs.

In the example of FIG. 3A, the electromechanical switching device 300 also includes one or more snap catches 320 configured to apply a first amount of a force to prevent the moveable contact 303 from extending beyond a particular distance from the terminals. During a short circuit event, the amount of Lorentz forces acting on the moveable contact 303 to direct the moveable contact 303 away from the plurality of terminals may exceed the first amount of the force from the one or more snap catches 320 such that the moveable contact 303 extends past a ledge 380 of the one or more snap catches 320 towards the base 330.

Figure 3B:
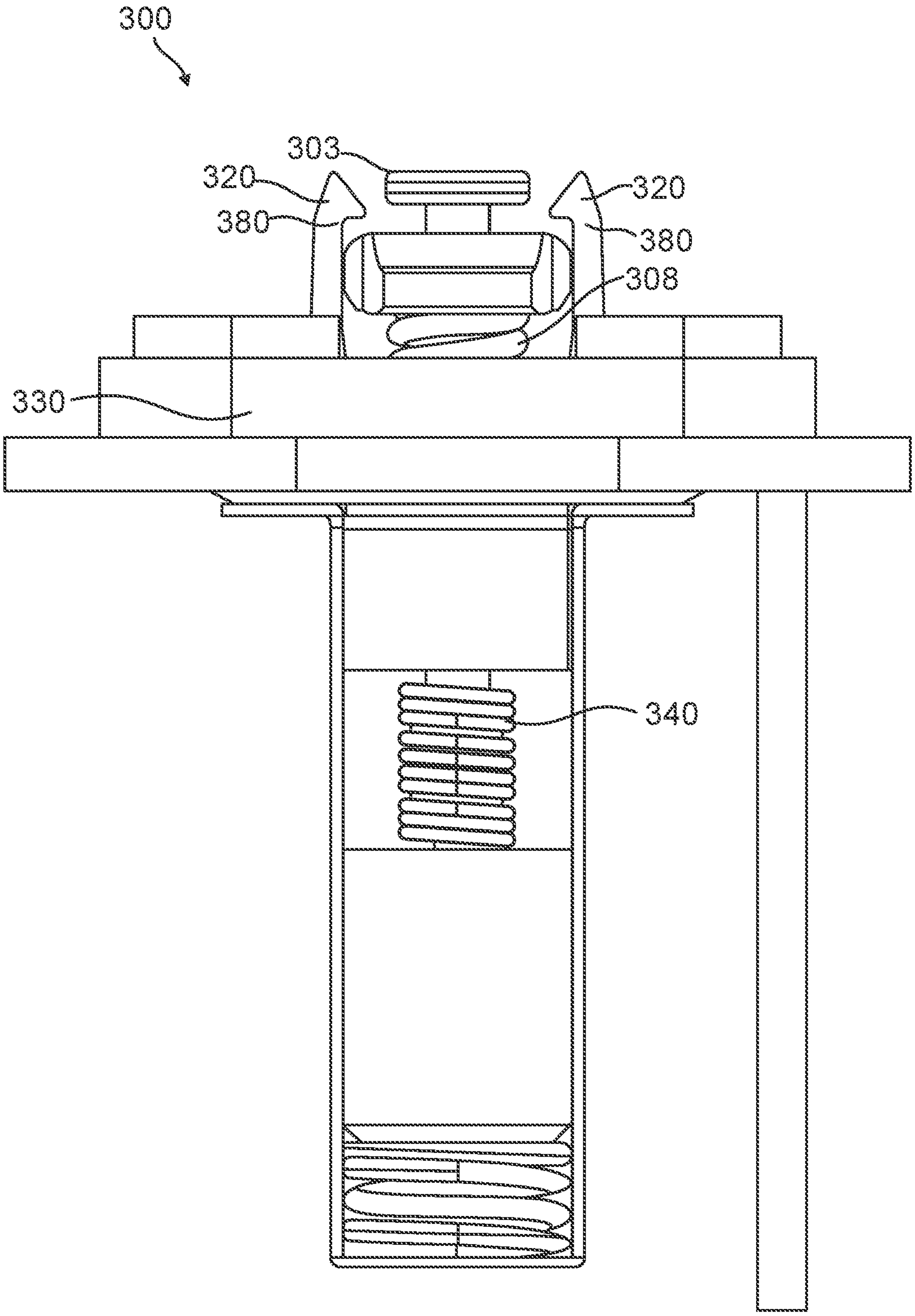
FIG. 3B is a diagram illustrating a side cross-sectional view of the example electromechanical switching device of FIG. 3A in the over-travel position.

However, as can be seen in the example of FIG. 3B, once the moveable contact 303 has extended past the ledge 380 of a snap catch, the ledge 380 acts as a hard stop that prevents the moveable contact from returning to a normal operating range from the plurality of terminals.

That is, the electromechanical switching device 300 provides a secondary airgap that will open in the presence of a Lorentz force driven opening provided by a fault current. This secondary travel is enabled by removing the actuator plunger hard stop and replacing it with the upper actuator coil 308. The upper actuator coil 308 serves to position the actuator plunger 340 properly in a solenoid magnetic circuit (not pictured) during normal operation. It also serves to provide a larger airgap when it is impacted by the moveable contact 303 during a fault. A means of preventing restrike is provided using the one or more snap catches 320 to retain the moveable contact 303 in the faulted position.

For a conventional contactor, if a short circuit is encountered, the contactor is thrown open by levitation forces. The inertia of this motion can cause the moveable contact to continue to travel downwards after the plunger hits the hard stop. This effectively compresses the moveable contact spring and in some cases has been seen to enable the contactor to break larger loads than it is rated to. The electromechanical device described below seeks to enhance that behavior by replacing the fixed hard stop with an overtravel spring, and by decreasing the time it takes to stretch the arc within the chamber. The overtravel spring enables an even larger dynamic airgap to enhance breaking while maintaining the relationship of the plunger to the solenoid upper and lower static cores which is critical to achieve pull-in during normal operation. With this added overtravel, friction/retention features are introduced to prevent the moveable subassembly from rebounding, thus preventing an arc from re-forming (restrike). An arc guiding stationary tip geometry encourages early formation and stretching of the arc. An exoskeleton reinforced housing is able to withstand the localized pressure increase resulting from these arcing events allowing the system to stretch the arc until suppression.

Figure 4:
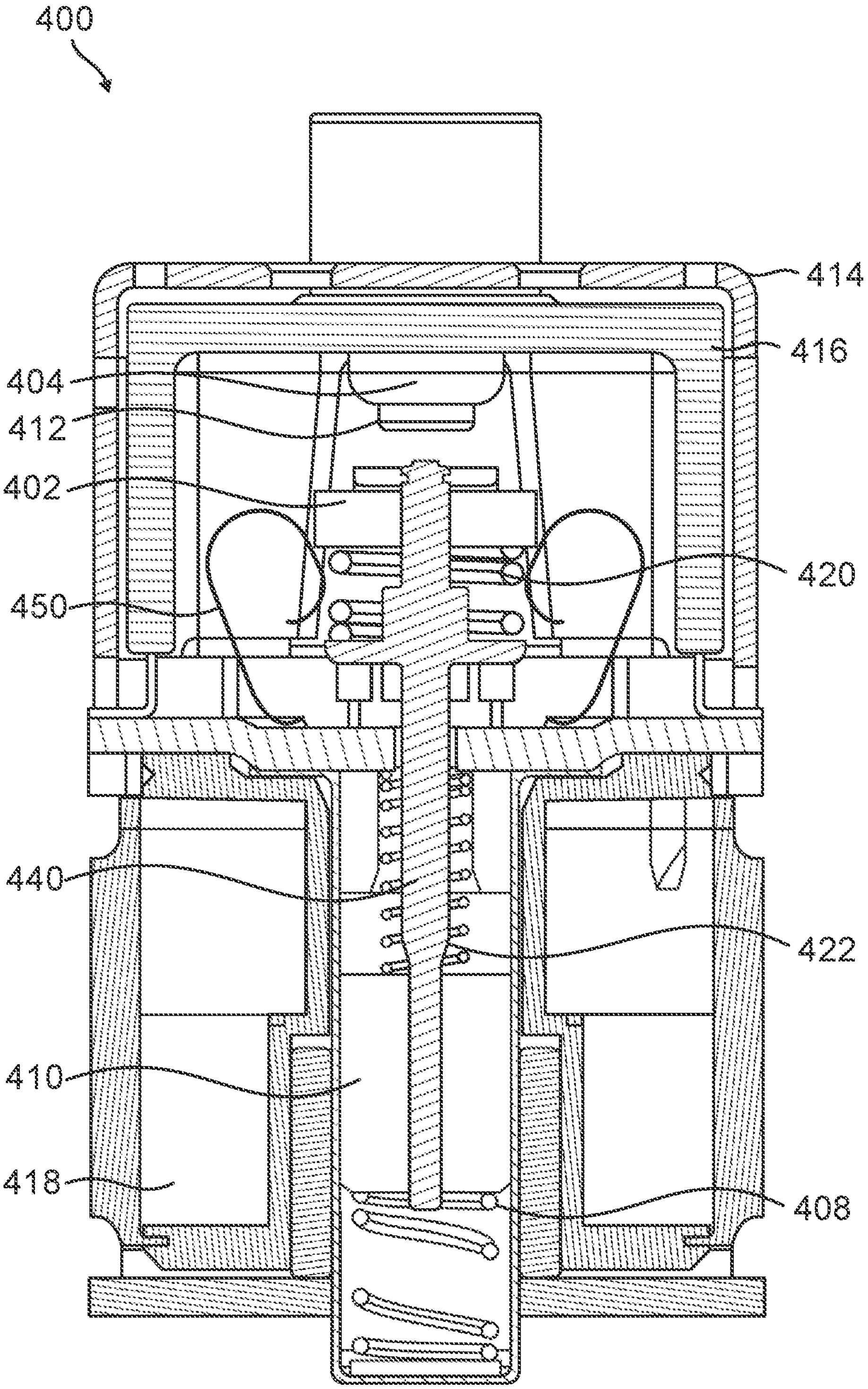
FIG. 4 is a diagram illustrating a cross-sectional view of another example an electromechanical switching device with a dynamic over-travel feature according to at least one embodiment of the present disclosure.

For further explanation, FIG. 4 is a diagram illustrating a cross-sectional view of another example electromechanical switching device 400 with an over-travel feature according to at least one embodiment of the present disclosure. The electromechanical switching device 400 includes one or more terminals 404 and a moveable contact 402 for opening and closing a connection with the one or more terminals 404. The switching device also includes an actuator plunger 440 coupled to the moveable contact 402 and configured to position the moveable contact 402 relative to the one or more terminals within a chamber of a ceramic housing 416. The plunger 440 includes a plunger base 410 that is actuated by a static solenoid magnetic circuit 418. Energizing the solenoid magnetic circuit 418 drives the plunger base 410 upward within an actuator cavity, thereby driving the moveable contact 402 into contact with the one or more terminals 404, i.e., a CLOSED position. A contact spring 420 that is compressed in this CLOSED position biases the moveable contact against the one or more terminals 404 to prevent an unintentional break. An actuator spring 422 facilitates circuit breaking when the solenoid magnetic circuit 418 is deenergized to place the switching device in the OPEN position. The ceramic housing 416 provides an arc chamber.

In this embodiment, the switching device 400 also includes an overtravel spring 408 placed under the plunger base 410 within the actuator cavity. The overtravel spring 408 provides a hard stop for actuator subassembly including the plunger 440 and positions the plunger relative to the solenoid upper and lower static cores. During max break short circuit events, the force of the fault arcing will throw the contactor (switching device) open and the overtravel spring 408 enables an appreciable increase in the air gap by allowing the moveable contact to move beyond the OPEN position. The amount of Lorentz forces acting on the moveable contact 402 may overcome a bias force of the overtravel spring 408 to allow for an increase in the air gap between the moveable contact 402 and the one or more terminals 404. That is, during a fault or short circuit event, the air gap between the moveable contact 402 and the one or more terminals 404 is greater than the air gap when the switching device is in the OPEN position. This allows the contactor to break loads that normally require a separate pyro-switch or fuse to interrupt, while also decreasing the time it takes to stretch the arc within the chamber.

The air gap is further assisted by the design of a stationary tip geometry 412 to encourage the formation and stretching of the arc in the chamber to assist in decreasing suppression time. An exoskeleton 414 provides reinforcement of the ceramic housing 416 and further provides the dual benefit of improved post break isolation and increased mechanical robustness to prevent rupture.

In the example of FIG. 4, the electromechanical switching device 400 also includes one or more deformable friction/retention features 450 (e.g., spring clip, tension clips, u-clip) configured to prevent the moveable contact 402 from restriking. In some examples, a pair of friction/retention features 450 is placed on both sides of the moveable contact 402 and separated by a minimum distance that is less than a dimension of the moveable contact 402. During a short circuit event, the amount of Lorentz forces acting on the moveable contact 402 to direct the moveable contact 402 away from the plurality of terminals may force the moveable contact 402 between the deformable friction/retention features 450 such that the friction/retention features hold the moveable contact 402 in place, thus maintaining the additional air gap allowed by the overtravel spring 408.

Figure 5:
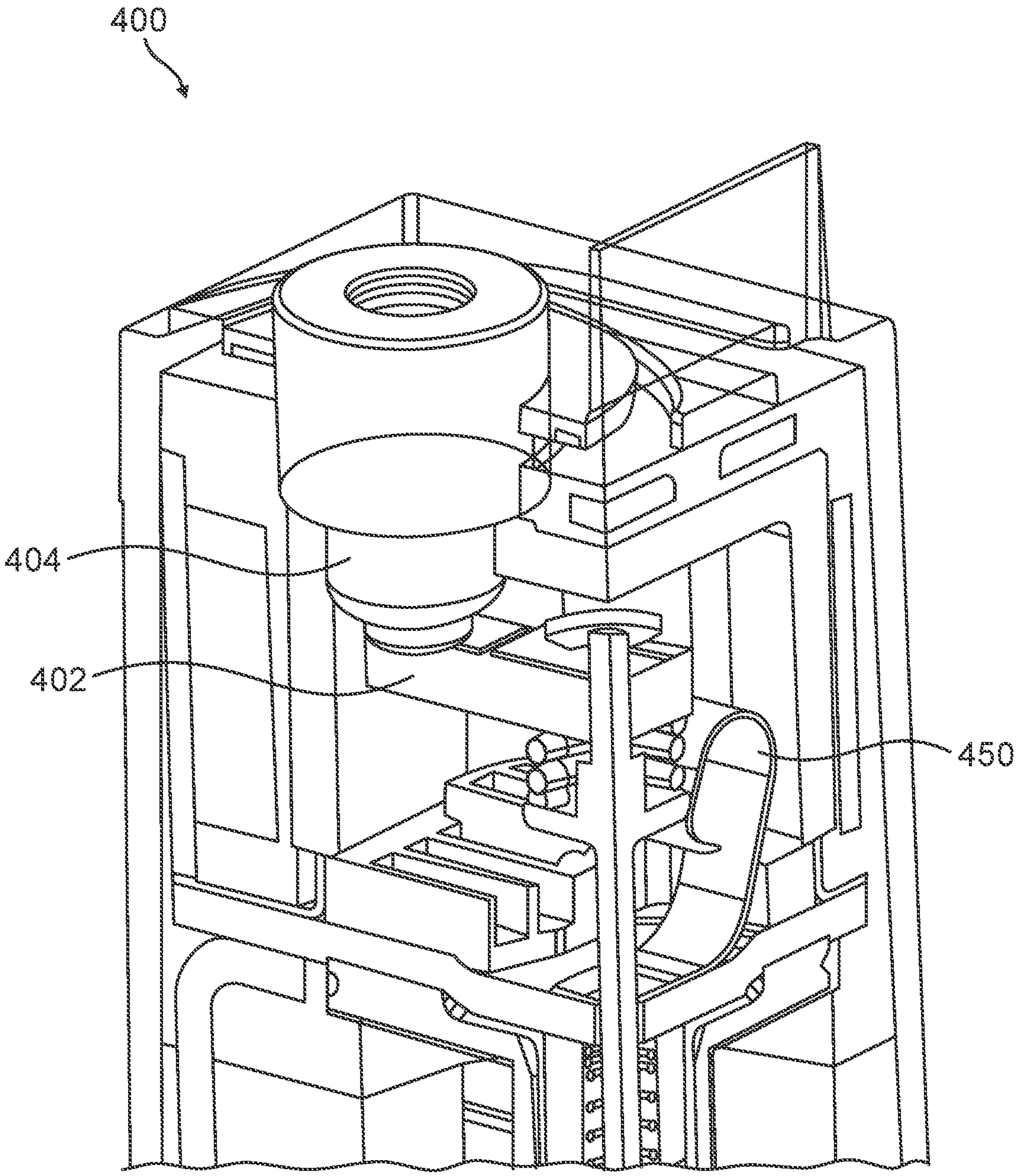
FIG. 5 is a diagram illustrating a sectional view of the example electromechanical switching device of FIG. 4.
Figure 6C:
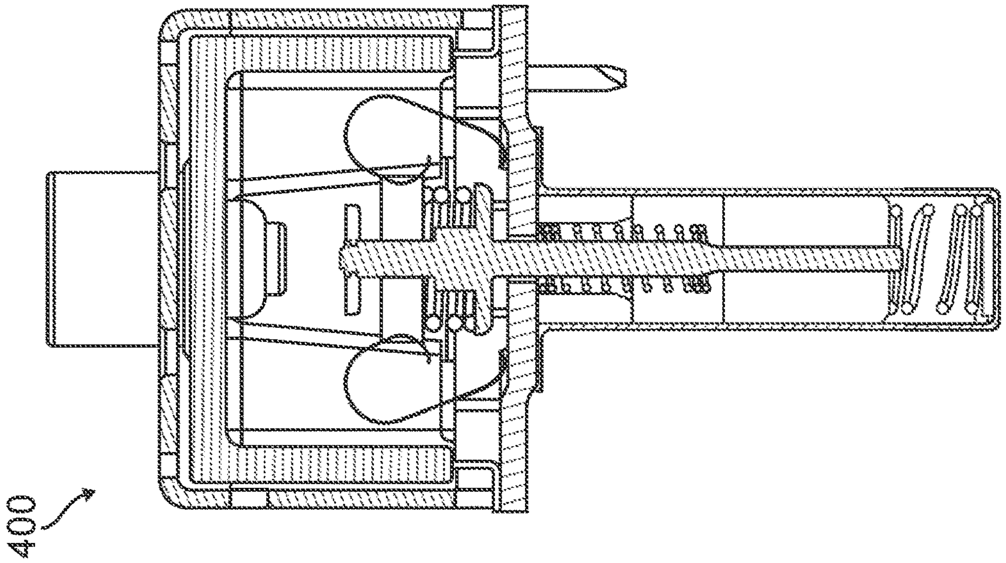
FIG. 6C is a diagram illustrating the example electromechanical switching device of FIG. 4 in the POST-INTERRUPT position.
Figure 6B:
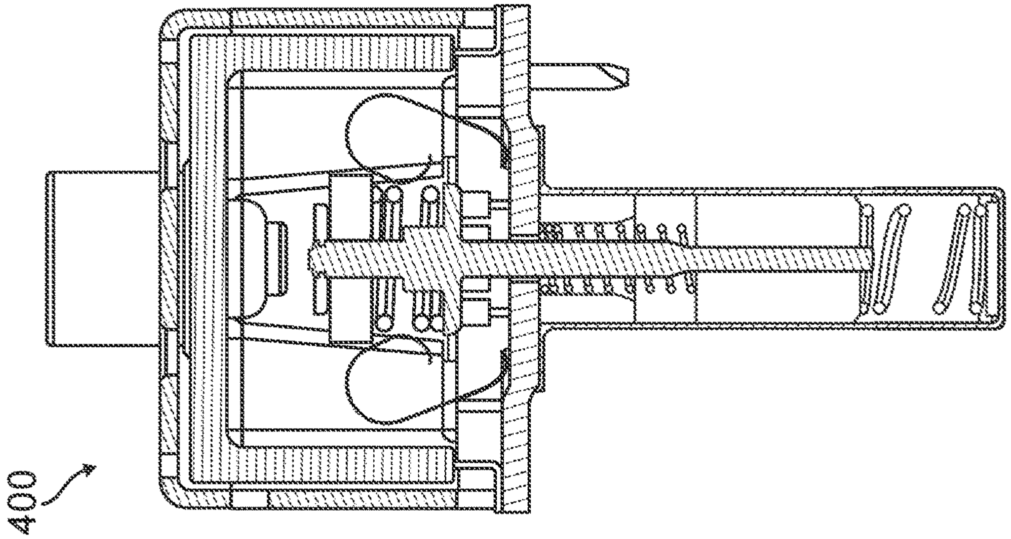
FIG. 6B is a diagram illustrating the example electromechanical switching device of FIG. 4 in the OPEN position.
Figure 6A:
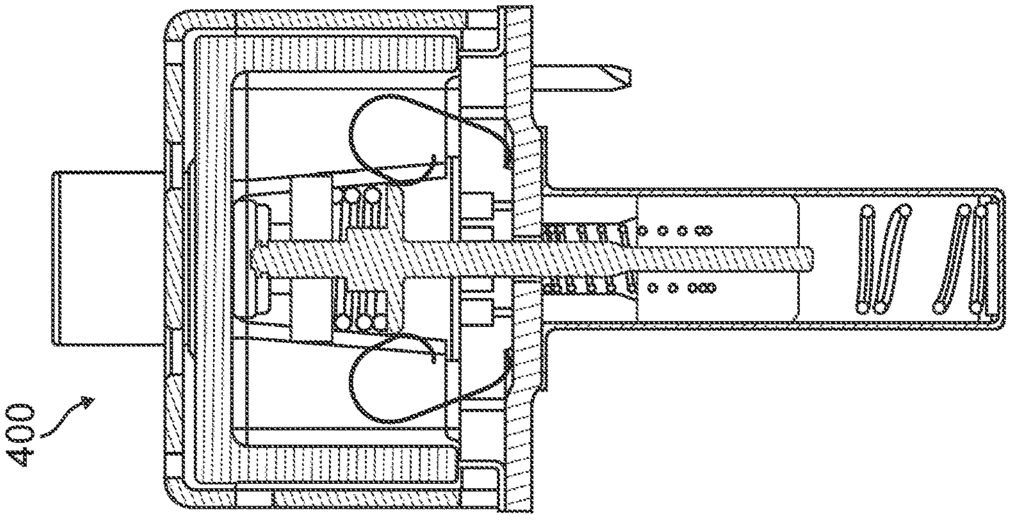
FIG. 6A is a diagram illustrating the example electromechanical switching device of FIG. 4 in the CLOSED position.

FIG. 5 is a diagram illustrating a sectional view of the example electromechanical switching device of FIG. 4. FIG. 6A is a diagram illustrating the example electromechanical switching device of FIG. 4 in the CLOSED position. FIG. 6BA is a diagram illustrating the example electromechanical switching device of FIG. 4 in the OPEN position. FIG. 6C is a diagram illustrating the example electromechanical switching device of FIG. 4 in the POST-INTERRUPT position after a short circuit event, showing an increase in the air gap compared to FIG. 6B.

In view of the foregoing it will be appreciated that the electromechanical switching device 400 provides a secondary airgap that will open in the presence of a Lorentz force driven opening provided by a fault current. This secondary travel is enabled by removing the actuator plunger hard stop and replacing it with the overtravel spring 408. The overtravel spring 408 enables an even larger dynamic air gap to enhance breaking while maintaining the relationship of the plunger to the solenoid upper and lower static cores which is critical to achieve pull-in during normal operation. With this added overtravel, friction/retention features 450 are introduced to prevent the moveable subassembly from rebounding, thus preventing an arc from re-forming (restrike). The arc guiding stationary tip geometry 412 encourages early formation and stretching of the arc. The exoskeleton 414 reinforces the housing to withstand the localized pressure increase resulting from these arcing events allowing the system to stretch the arc until suppression. This will result in a simpler, lower cost architecture for low cost EVs.

According to embodiments of the present application, an electromechanical switching device with a dynamic air gap mechanism may include some combination of an overtravel spring, a fusing-tip of one or more of the static terminals, and one or more restrike prevention mechanisms, such as one or more snap catches, dampening hard-stop component, and one or more friction/retention features. The one or more dynamic air gap mechanisms may be used in combination to increase the size of the air gap beyond that of the closed position in response to a fault current. As explained above, the electromechanical switching device may further improve performance by utilizing a ceramic arc chamber and an exoskeleton reinforcing the ceramic arc chamber.

Advantages and features of the present disclosure can be further described by the following statements:

1. An electromechanical switching device comprising: one or more terminals; a moveable contact; an actuator assembly for moving the moveable contact between a closed position in which the moveable contact contacts the one or more terminals and an open position in which an air gap is maintained between the moveable contact and the one or more terminals; and a dynamic air gap mechanism configured to increase the air gap beyond that of the open position in response to a fault current.
2. The electromechanical switching device of statement 1, wherein the dynamic air gap mechanism includes an overtravel spring; wherein, when an amount of Lorentz forces acting on the moveable contact to direct the moveable contact away from the one or more terminals exceeds an amount of bias force provided by the overtravel spring, the overtravel spring compresses to provide the increased air gap between the moveable contact and the one or more terminals.
3. The electromechanical switching device of statement 1 or 2, wherein the overtravel springs acts as a stop on the actuator assembly and positions the actuator assembly relative to a solenoid magnetic circuit.
4. The electromechanical switching device of any of statements 1-3, wherein the dynamic air gap mechanism includes a fusing-tip on the one or more terminals; wherein the fusing-tip is configured to melt during a short-circuit event such that the air gap between the moveable contact and the one or more terminals is increased.
5. The electromechanical switching device of any of statements 1-4 further comprising a restrike prevention mechanism.
6. The electromechanical switching device of any of statements 1-5, wherein the restrike prevention mechanism applies a first amount of a force to prevent the moveable contact from extending beyond a particular distance from the one or more terminals.
7. The electromechanical switching device of any of statements 1-6 wherein when the amount of Lorentz forces acting on the moveable contact to direct the moveable contact away from the one or more terminals exceed the first amount of the force from the restrike prevention mechanism, the moveable contact extends past the restrike prevention mechanism towards a base such that the air gap between the moveable contact and the one or more terminals is increased beyond that of the open position.
8. The electromechanical switching device of any of statements 1-7 wherein when the moveable contact extends past a particular location on the restrike prevention mechanism away from the one or more terminals, the restrike prevention mechanism is configured to keep the moveable contact from returning past the particular location on the restrike prevention mechanism towards the one or more terminals.
9. The electromechanical switching device of any of statements 1-8, wherein the restrike prevention mechanism includes one or more friction/retention features configured to apply force to the moveable contact such that the moveable contact is retained with the increased air gap.
10. The electromechanical switching device of any of statements 1-9, wherein the restrike prevention mechanism includes one or more snap catches features configured to apply force to the moveable contact such that the moveable contact is retained with the increased air gap.
11. The electromechanical switching device of any of statements 1-10, wherein the restrike prevention mechanism includes a dampening hard-stop component with a low coefficient of restitution.
12. The electromechanical switching device of any of statements 1-11 further comprising an upper actuator spring that is coupled to the actuator assembly and applies a force to the moveable contact to move the moveable contact towards the one or more terminals.
13. The electromechanical switching device of any of statements 1-12 further comprising a lower actuator spring that is coupled to the actuator assembly and applies a force to the actuator assembly.
14. The electromechanical switching device of any of statements 1-13 further comprising: a ceramic arc chamber; and an exoskeleton reinforcing the ceramic arc chamber.
15. An electromechanical switching device comprising: a plurality of terminals with fusing-tips; a moveable contact for connecting with the fusing-tips of the plurality of terminals; and an actuator assembly for moving the moveable contact into contact with the fusing-tips of the plurality of terminals.
16. The electromechanical switching device of statement 15 wherein the fusing-tip includes arc guiding stationary tip geometry that is configured to melt during a short-circuit event such that the air gap between the moveable contact and the one or more terminals is increased.
17. The electromechanical switching device of statement 15 or 16 further comprising at least one of a restrike prevention mechanism and an overtravel spring.
18. An electromechanical switching device comprising: one or more terminals; a moveable contact; an actuator assembly for moving the moveable contact between a closed position in which the moveable contact contacts the one or more terminals and an open position in which an air gap is maintained between the moveable contact and the one or more terminals; and an overtravel spring supporting the actuator assembly that acts as a stop on the actuator assembly and positions the actuator assembly relative to a solenoid magnetic circuit.
19. The electromechanical switching device of statement 18, wherein, when an amount of Lorentz forces acting on the moveable contact to direct the moveable contact away from the one or more terminals exceeds an amount of bias force provided by the overtravel spring, the overtravel spring compresses to provide an increased air gap between the moveable contact and the one or more terminals.

20. The electromechanical switching device of statement 18 or 19 further comprising at least one of a restrike prevention mechanism and a fusing-tip on the one or more terminals.

It will be understood from the foregoing description that modifications and changes may be made in various embodiments of the present disclosure without departing from its true spirit. The descriptions in this specification are for purposes of illustration only and are not to be construed in a limiting sense.

What is claimed is:

1. An electromechanical switching device comprising:

one or more terminals;

a moveable contact;

an actuator assembly for moving the moveable contact between a closed position in which the moveable contact contacts the one or more terminals and an open position in which an air gap is maintained between the moveable contact and the one or more terminals;

an overtravel spring configured to compress to provide an increased air gap between the moveable contact and the one or more terminals beyond that of the open position in response to a fault current; and a restrike prevention mechanism that includes one or more friction/retention features configured to apply force to the moveable contact such that the moveable contact is retained with the increased air gap.

2. The electromechanical switching device of claim 1, wherein the overtravel springs acts as a stop on the actuator assembly and positions the actuator assembly relative to a solenoid magnetic circuit.

3. The electromechanical switching device of claim 1, wherein the dynamic air gap mechanism includes a fusing-tip on the one or more terminals;

wherein the fusing-tip includes arc guiding stationary tip geometry that is configured to melt during a short-circuit event such that the air gap between the moveable contact and the one or more terminals is increased.

4. The electromechanical switching device of claim 1 further comprising an upper actuator spring that is coupled to the actuator assembly and applies a force to the moveable contact to move the moveable contact towards the one or more terminals.

5. The electromechanical switching device of claim 1 further comprising a lower actuator spring that is coupled to the actuator assembly and applies a force to the actuator assembly.

6. The electromechanical switching device of claim 1 further comprising:

a ceramic arc chamber; and an exoskeleton reinforcing the ceramic arc chamber.

* * * * *